United States Patent [19]
Onda et al.

[11] 3,886,572
[45] May 27, 1975

[54] SHUTTER ASSEMBLY HAVING MEANS FOR SEQUENTIALLY BRAKING AND STOPPING SHUTTER BLADES

[75] Inventors: Eiichi Onda, Misato; Mitsuo Koyama; Tadashi Nakagawa, both of Yotsukaido, all of Japan

[73] Assignee: Seiko Koki Kabushiki Kaisha, Japan

[22] Filed: Aug. 27, 1973

[21] Appl. No.: 391,528

[30] Foreign Application Priority Data
Aug. 25, 1972 Japan............................ 47-98404

[52] U.S. Cl.............................. 354/252; 354/246
[51] Int. Cl............................................. G03b 9/26
[58] Field of Search.......... 95/53 R, 55, 58, 59, 60; 354/252

[56] References Cited
UNITED STATES PATENTS

| | | | |
|---|---|---|---|
| 2,418,644 | 4/1947 | Hutchison, Jr. et al. | 95/55 |
| 2,975,689 | 3/1961 | Chatani | 95/55 |
| 3,391,627 | 7/1968 | Leusenke | 354/252 |
| 3,580,156 | 5/1971 | Loseries | 95/60 |
| 3,628,438 | 12/1971 | Loseries | 95/55 |
| 3,683,778 | 8/1972 | Weiss | 95/60 |

*Primary Examiner*—Samuel S. Matthews
*Assistant Examiner*—Russell E. Adams, Jr.
*Attorney, Agent, or Firm*—Robert E. Burns; Emmanuel J. Lobato; Bruce L. Adams

[57] ABSTRACT

A shutter assembly has a plurality of shutter blades divided in a shutter-opening blade group and a shutter-closing blade group. A shutter actuating mechanism independently actuates both groups of shutter blades to effect opening and closing of a shutter aperture and the actuating mechanism comprises a first set of generally parallel actuating levers connected to the shutter blades of the shutter-opening blade group by means of a pin-and-slot connection so that pivotal movement of the first set of actuating levers effects opening of the shutter aperture. A second set of generally parallel actuating levers is connected to the shutter blades of the shutter-closing blade group in a similar manner so that pivotal movement of the second set of actuating levers effects closing of the shutter aperture. A flexible spring plate has an arcuate braking portion disposed along the path of travel of the shutter blades for frictionally engaging therewith and braking the high speed motion of the shutter blades and the spring plate has a stopping portion disposed directly in the path of travel of the shutter blades for abutting therewith and positively stopping the shutter blades at a predetermined stop position.

7 Claims, 5 Drawing Figures

SHUTTER ASSEMBLY HAVING MEANS FOR SEQUENTIALLY BRAKING AND STOPPING SHUTTER BLADES

The present invention relates generally to camera shutters and more particularly relates to a camera shutter assembly having means for sequentially braking and then precisely stopping the high speed motion of the shutter blades during the taking of an exposure.

Cameras employing shutter assemblies of the moveable blade type are in wide use today and such cameras employ a plurality of shutter blades which are moveable to open and close a shutter aperture to effect an exposure. During the opening movement and the closing movement of the shutter blades, the blades move at high speed and it is necessary to completely stop the motion of the blades at a preselected stop position in order to obtain an accurate exposure. If the high speed motion of the shutter blades is not properly attenuated, the blades will continue past their intended stop position or rebound back from their stop position to again partially open the shutter aperture whereupon reexposure of the film occurs. Moreover, the shock imparted to the shutter assembly by the rebounding action of the shutter blades detrimentally affects the operating life of the camera and the accuracy of the shutter assembly is severely lessened.

One technique that has heretofore been used to prevent such phenomena is to provide a spring plate along the path of travel of the shutter blades for resiliently engaging with the shutter blades to frictionally brake their motion. The spring plate biases the shutter blades against a stationary plate as the blades near the end of their travel and by such action, the shutter blades are frictionally urged against the stationary plate and thereby stopped. Unfortunately, this technique depends for its accuracy upon the balance between the spring force exerted by the spring plate and the velocity of the shutter blades and either or both of these factors can vary. If the spring force is too weak, the shutter blades will move past their intended stop position whereas if the spring force is too great, the blades will be stopped before reaching their intended stop position. Manufacturing errors and tolerances result in the production of spring plates having a wide range of spring characteristics and consequently it is difficult to construct shutter assemblies of this type which effectively brake and stop the high speed motion of the shutter blades.

Another technique that has been used to prevent occurrence of such phenomena is to provide a narrow groove in which the shutter blades enter upon completion of their movement and the narrow groove engages with the shutter blades and stops them at the intended stop position by a wedging action. However this technique has not proven to be successful since additional space is needed to accommodate the grooved member and though the narrow groove effectively stops the shutter blades at the intended stop position, considerable energy must be expended to release the wedged shutter blades from the groove and thus a carefully calibrated device must be employed to supply the necessary torque to remove the wedged shutter blades from the groove. Moreover, a careful and delicate adjustment must be made to ensure the proper degree of wedging action between the shutter blades and the narrow groove.

A further technique which has been used is to position a fixed abutment member in the path of travel of the shutter blades in conjunction with a rebound prevention pawl for engaging with the shutter blades as they abut the abutment member thereby preventing their rebound movement. This technique is disadvantageous since considerable space is needed to house the abutment member and the pawl and thus it is not possible to reduce the size of the shutter assembly to that currently desired due to the present emphasis on smaller-sized compact cameras.

It is therefore a primary object of the present invention to provide a shutter assembly for a camera which has combined means for braking and precisely stopping the high speed motion of the shutter blades during both their opening and closing movement.

It is a further object of the present invention to provide a shutter assembly for a camera which effectively overcomes the aforementioned problems and disadvantages of the prior art shutter assemblies.

It is yet another object of the present invention to provide a shutter assembly having a single flexible spring plate for sequentially braking the high speed motion of the shutter blades and then stopping the blades during both their opening and closing movement.

The above and other objects of the present invention are carried out by a shutter assembly comprising a plurality of shutter blades divided into a shutter-opening blade group and a shutter-closing blade group. A shutter actuating means independently actuates both groups of shutter blades to effect opening and closing of a shutter aperture and the actuating means comprises a first set of generally parallel actuating levers connected to the shutter blades of the shutter-opening blade group by means of a pin-and-slot connection so that pivotal movement of the first set of actuating levers effects opening of the shutter aperture. A second set of generally parallel actuating levers is connected to the shutter blades of the shutter-closing blade group in a similar manner so that pivotal movement of the second set of actuating levers effects closing of the shutter aperture. A flexible spring plate is mounted along the path of travel of the shutter blades in each blade group. The spring plate has an arcuate braking portion projecting into the path of travel for frictionally engaging with the shutter blades and has a stopping portion extending directly across the path of travel for abutting with the shutter blades and precisely stopping them at a predetermined stop position.

Having in mind the above and other objects that will be evident from an understanding of this disclosure, the present invention comprises the combinations and arrangements of parts as illustrated in the presently preferred embodiment of the invention which is hereinafter set forth in sufficient detail to enable those persons skilled in the art to clearly understand the function, operation, construction and advantages of it when read in conjunction with the accompanying drawings, wherein like reference characters denote like parts in the various views, and wherein.

Figure 1:
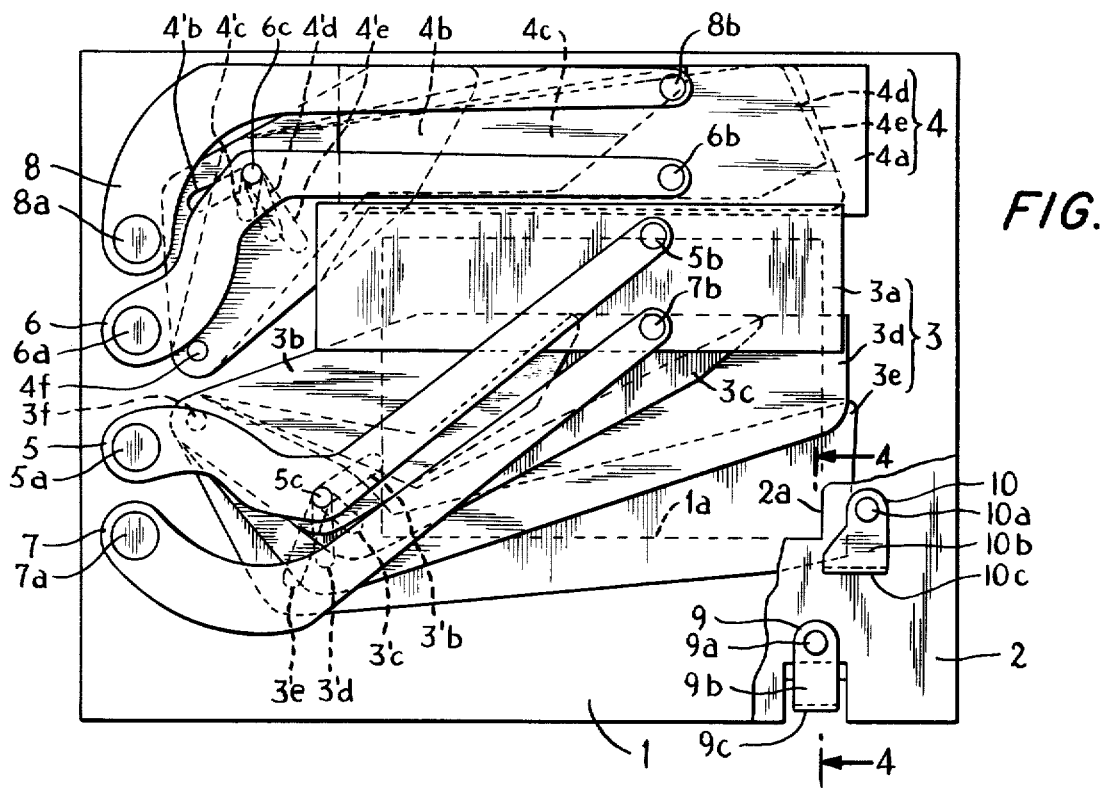
FIG. 1 is a plan view of the interior of a focal plane shutter assembly constructed in accordance with the principles of the invention and illustrating the shutter assembly in a cocked condition.

Referring now to FIG. 1 of the drawings, the focal plane shutter assembly comprises a pair of spaced-apart and opposed opposing base plates 1 and 2 constituting the major structural support members of the shutter assembly. The base plate 1 is provided with a rectangular shutter aperture 1a which comprises a film exposure window and during use of the shutter assembly in a camera, a film to be exposed is advanced behind the exposure window in a manner well known in the art. Likewise, the base plate 2 is provided with a similarly shaped opening 2a in registry with the shutter aperture 1a to permit unrestricted passage of light therethrough during the taking of an exposure.

The shutter assembly includes two groups of shutter blades 3 and 4 and the former group consists of shutter blades 3a, 3b, 3c, 3d and 3e and comprises a shutter-opening blade group whereas the latter group consists of shutter blades 4a, 4b, 4c, 4d and 4e and comprises a shutter-closing blade group. The shutter blade 3a of the shutter-opening blade group 3 has a rectangular configuration and comprises what is known in the art as a slit-forming shutter blade which coacts with the base plate 1 to effect opening of the rectangular shutter aperture 2a in the form of a progressively increasing rectangular slit and the remaining shutter blades in this group have a more or less segmented shape. In a similar manner, the shutter blade 4a of the shutter-closing blade group 4 comprises a slit-forming shutter blade which coacts with the base plate 1 to effect closing of the shutter aperture 1a in the form of a progressively decreasing rectangular slit and the remaining shutter blades 4b–4 e have a segmented shape.

A shutter actuating means coacts with the shutter blade groups to independently actuate them to effect sequential opening and closing of the shutter aperture 1a. The shutter actuating means comprises a set of opening actuating levers 5, 7 for actuating the shutter-opening blade group 3 and a set of closing actuating levers 6, 8 for actuating the shutter-closing blade group 4.

The opening actuating levers 5 and 7 comprise a primary actuating lever 5 mounted at one end for pivotal movement about a pin 5a, and an auxiliary actuating lever 7 mounted at one end for pivotal movement about a pin 7a, both of the pins 5a and 7a being affixed to the base plate 1. Pins 5b and 7b are provided at the other ends of the levers 5 and 7, respectively, and the slit-forming shutter blade 3a is pivotally connected to the pins 5b and 7b. By such an arrangement the actuating levers 5 and 7 are mounted for pivotal movement as a unit since the pivot points 5a, 7a and 5b, 7b are fixed relative to each other and thus the levers maintain a generally parallel disposition during their pivotal movement.

The primary actuating lever 5 has a driving pin 5c connected thereto and the driving pin slideably extends in elongated grooves 3'b, 3'c, 3'd and 3'e provided in respective ones of the segmented shutter blades 3b, 3c, 3d and 3e. The segmented shutter blades 3b–3e are arranged in superimposed stacked relationship and all are pivotally mounted about a fixed pivot pin 3f. The elongated slots 3'b–3'e have carefully selected lengths and directions which are chosen in relation to the shape and position of the segmented shutter blades 3b–3e so that pivotal movement of the actuating lever 5 in a clockwise direction in FIG. 1 will effect smooth opening of the shutter aperture 1a due to the combined effects of the pin-and-slot connections between the actuating lever 5 and the segmented blades 3b–3d and the pivotal connection of the actuating levers 5 and 7 with the slit-forming shutter blade 3a.

The shutter blades 3 have an extended position, as shown in FIG. 1, wherein the segmented blades 3b–3e are fanned out and coact with the slit-forming blade 3a to effectively close the shutter aperture 2a in a light-tight manner. The shutter blades 3 also have a retracted position (not shown in the drawings) wherein the segmented shutter blades 3b–3e along with the slit-forming shutter blade 3a are retracted out of registry with the shutter aperture 1a.

The shutter-closing blade group 4 and the closing actuating levers 6 and 8 assembly comprise a mirror image of the shutter-opening blade group 3 and the opening actuating levers 5 and 7 assembly. The blade group 4 consists of a slit-forming shutter blade 4a having a rectangular shape, and a plurality of segmented shutter blades 4b–4e.

The primary actuating lever 6 is pivotally mounted about a pin 6a affixed to the base plate 1 and the auxiliary actuating lever 8 is pivotally mounted upon a pin 8a also affixed to the base plate 1. A pin 6b is connected to an end portion of the primary actuating lever 6 and a pin 8b is connected to the end of the auxiliary actuating lever 8. The slit-forming blade 4a is pivotally connected to the pins 6b and 8b and by such a construction, the actuating levers 6 and 8 move as a unit and always retain the same relative positions with respect to each other. The segmented blades 4b–4e are all pivotally mounted about a pin 4f secured to the base plate 1 and these blades have elongated slots 4'b–4'e. A drive pin 6c is secured to the primary actuating lever 6 and slides within each of the grooves 4'b–4'e to form pin-and-slot connections therewith.

The shutter actuating means 5–8 is connectable to drive mechanism contained in the camera during use of the shutter assembly to effect forward and return movement of the shutter blade groups to complete an exposure. Such a drive mechanism is well known in the art and will not be further described here since such does not comprise part of the present invention. Suffice it to say, the drive mechanism includes a spring system for rapidly pivoting the opening actuating levers 5 and 7 in a clockwise direction in response to manual depression of a shutter release lever to effect opening of the shutter aperture and after a predetermined exposure time has elapsed, the spring system effects rapid clockwise turning of the closing actuating levers 6 and 8 to effect closing of the shutter aperture.

In accordance with the present invention, the shutter assembly includes combined braking-stopping means for sequentially braking or slowing down the high speed motion of the shutter blades as they near completion of their working stroke and then stopping the shutter blades at a prescribed stop position in such a manner so as to prevent jarring impacts from being imparted to the shutter assembly as well as preventing reexposure of the film due to a partial reopening of the shutter aperture. A braking-stopping means 9 is associated with the shutter-opening blade group 3 and another braking-stopping means 10 is associated with the shutter-closing blade group 4 and both means 9, 10 are separate and distinct from the shutter actuating means 5–8.

Figure 4:
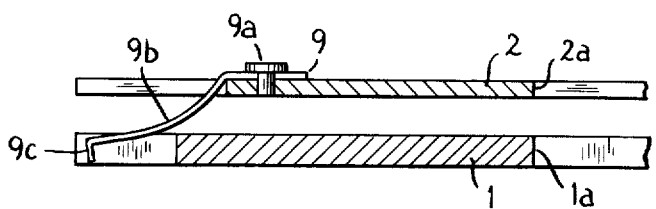
FIG. 4 is an enlarged cross-sectional view of a braking-stopping mechanism according to the invention and illustrating same with the shutter in a cocked condition.
Figure 5:
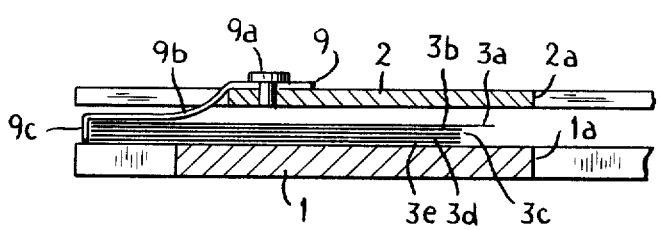
FIG. 5 is an enlarged cross-sectional view similar to FIG. 4 but showing the shutter in a closed condition.

As seen in FIGS. 1, 4 and 5, the braking-stopping means 9 comprises a single resiliently flexible member 9 composed of a spring plate material which possesses sufficient resiliency to brake the high speed motion of the shutter blades. The flexible member is mounted upon a pin 9a secured to the base plate 2 and the flexible member 9 extends through an opening provided in the base plate 2 and projects into the path of travel of the blade group 3. As seen in FIGS. 4 and 5, the flexible member 9 has a braking portion 9b which has an arcuate, bowed configuration which bows inwardly into the path of travel of the shutter blades 3a–3e. The flexible member 9 also has a stopping portion 9c which comprises a bent end portion of the flexible member and the bent portion 9c extends directly into and completely blocks the path of travel of the shutter blades 3a–3e.

The braking-stopping means 10 is similar in construction and function to the braking-stopping means 9 and comprises a flexible member 10 composed of a spring plate material which is mounted upon the base plate 2 by means of a pin 10a. The flexible member 10 has a braking portion 10b and a stopping 10c both disposed along the path of travel of the shutter blades 4a–4e for respectively braking and stopping the motion of the shutter blades.

A clearer understanding of the function and mode of operation of the braking-stopping means will now be described in conjunction with a description of the overall mode of operation of the shutter assembly. Referring to FIG. 1 which shows the shutter assembly in its cocked condition, the exposure aperture 1a is closed by the shutter-opening blade group 3 which is at this time in its extended state. The shutter-closing blade group 4 is in its retracted state and is cocked in readiness to close the shutter aperture.

When an exposure is to be taken, the camera release lever (not shown) is depressed and this action is transmitted through the drive mechanism (also not shown) to the shutter actuating means 5–8 thereby effecting clockwise pivotal movement of the opening actuating levers 5 and 7. The clockwise turning of the actuating levers 5 and 7 causes retraction of the shutter-opening blade group 3 from its extended state to its retracted state. The segmented shutter blades 3b–3e are thus driven about the pin 3f in a clockwise direction while the slit-forming shutter blade 3a also moves in a clockwise direction but since the slit-forming blade 3a is the trailing blade, the shutter aperture 2a is opened as a progressively increasing rectangular slit until the shutter aperture is completely opened.

As the shutter-opening blade group 3 approaches the end of its working stroke, the shutter blades slide into frictional engagement with the braking portion 9b of the braking-stopping means 9 causing flexure of the spring plate. As successive ones of the shutter blades 3e–3a frictionally engage with and slide along the underside of the braking portion 9b, the flexible member 9 is further flexed and therefore progressively increases its frictional engagement with the shutter blades. Thus the high speed motion of the shutter blades is rapidly braked and attenuated as they near completion of their working stroke.

As the shutter blades 3a–3e reach their intended stop position, they abut against the stopping portion 9c which is at this time raised directly into the path of travel of the shutter blades. The shutter blades engage with and abut directly against the stopping portion 9c, as shown in FIG. 5, whereupon the shutter blades are precisely stopped in their intended stop position with the shutter blades in their retracted state. It should be noted that when the shutter blades abut against the stopping portion 9c, the frictional force exerted by the braking portion 9b is at its maximum value and this frictional force is sufficient to prevent any rebounding of the shutter blades back from the stopping portion 9c and thus reexposure of the film is prevented.

After the elapsing of the desired exposure time, the shutter actuating means effects clockwise movement of the shutter-closing blade group 4 to effect closing of the shutter aperture 1a. The drive mechanism (not shown) effects clockwise turning of the closing actuating levers 6 and 8 thereby effecting corresponding clockwise pivotal movement of the shutter blades 4a–4e. In this case, the slit-forming shutter blade 4a is the leading shutter blade and moves downwardly over the shutter aperture to form a progressively decreasing rectangular slit and the clockwise motion of the shutter blade group 4 is continued until the blade group reaches its fully extended position wherein the segmented shutter blades 4b–4e fan out and coact with the slit-forming shutter blade 4a to reclose the shutter aperture 1a in a light-tight manner thereby terminating the exposure.

As the shutter blades 4a–4e approach the end of their working stroke, they slide into frictional engagement with the braking-stopping means 10 and the braking portion 10b effectively brakes and smoothly decelerates the high speed motion of the shutter blades after which the stopping portion 10c precisely stops the shutter blades in their intended stop position. Thus it may be seen that the braking-stopping means 9 and 10 effectively dissipate the kinetic energy of the shutter blades by the frictional engagement of the flexible members 9 and 10 with the shutter blades and the spring force of the flexible members 9 and 10 presses the shutter blades frictionally together as well as frictionally against the base plate 1. As seen in the drawings, the braking-stopping means 9 and 10 act on the same end portions of the shutter blades within the blade groups 3 and 4, respectively, so that the braking and stopping actions are smoothly accomplished. Moreover, it is understood that the braking-stopping means 10 is disposed out of the path of travel of the shutter-opening blade group 3 so as not to interfere with the shutter opening operation.

Figure 2:
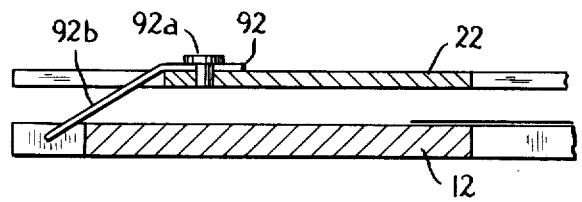
FIG. 2 is an enlarged cross-sectional view of a braking mechanism according to the prior art.

The superior advantages of the shutter assembly of the invention will be better appreciated upon comparing same with conventional shutter assemblies. FIG. 2 shows a typical prior art shutter assembly wherein a pair of opposed base plates 12 and 22 have a set of shutter blades housed therein for effecting a shutter opening or closing operation. An elastic spring plate 92 is secured on the base plate 22 by means of a pin 92a and the spring plate 92 is provided with a braking portion 92b which extends into the path of travel of the shutter blades. In this type of shutter assembly, there is no separate stopping portion of the spring plate and thus the actual stopping of the shutter blades is effectuated solely by the braking portion 92b of the spring plate 92. This technique has many drawbacks and does not effect accurate stopping of the shutter blades in a precise position as is the case of the shutter assembly of the invention. This is due to the fact that if the spring force of the spring plate 92 is too weak, the braking action of the braking portion 92b will be insufficient to stop the shutter blades whereas if the spring force is too strong, the braking action of the braking portion 92b will prematurely stop the shutter blades before they reach their intended stop position. Moreover, the spring force of the spring plate 92 gradually diminishes during use and thus both the braking and stopping functions cannot be accurately carried out.

Figure 3:
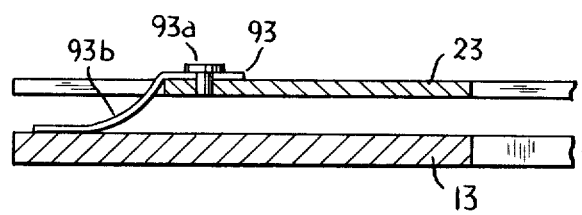
FIG. 3 is an enlarged cross-sectional view of another type of prior art mechanism.

Another prior art type of shutter assembly is shown in FIG. 3 and in this assembly, a pair of base plates 13 and 23 are disposed in spaced-apart relationship and house therebetween a set of shutter blades. A flexible spring plate 93 is secured to the base plate 23 by a pin 93a and the spring plate has a braking portion 93b which is normally pressed against the opposing base plate 13. Since there is no depending portion of the spring plate which depends directly across the path of travel of the shutter blades, the braking portion 93b must normally exert a relatively high spring force against the base plate 13 in order to ensure stoppage of the shutter blades. This high spring force detrimentally affects the smooth braking action and if the spring force is reduced to obtain a smooth braking action, the shutter blades will not be precisely stopped at their intended stop position.

In addition, both of the prior art shutter assemblies shown in FIGS. 2 and 3 exhibit different braking and stopping characteristics depending upon the orientation of the camera. For example, if the shutter blades move in the downward direction, they are assisted by the force of gravity whereas if they move horizontally or in the upper direction, the effects of gravity are different and thus the spring plates must be delicately adjusted to obtain the proper spring force. These problems are overcome and obviated by the shutter assembly of the invention since the spring plate has a braking portion which brakes the speed of the shutter blades and a stopping portion which effects stopping of the shutter blades at a prescribed stop position. The exact spring force exerted by the braking portion is not nearly as critical in the shutter assembly of the invention as in the prior art assemblies since the braking portion works in conjunction with a stopping portion and the two portions together function to dissipate the high kinetic energy possessed by the rapidly moving shutter blades. Thus it may be seen that the shutter assembly of the invention utilizes a minimum space to effect precise stopping of the shutter blades and consequently the shutter assembly may be made very small in size and thus is especially suitable for use in miniature cameras.

The invention has been described in conjunction with one particular embodiment and it is understood that obvious modifications and changes will become apparent to those skilled in the art and the present invention is intended to cover all such modifications and changes falling within the spirit and scope of the invention as defined in the appended claims.

What we claim is:

1. A shutter assembly for a camera comprising: means defining a shutter aperture; a plurality of actuatable shutter blades comprising a first group of shutter-opening shutter blades actuatable through a working stroke from an extended position wherein they close said shutter aperture to a retracted position wherein they open said shutter aperture, and a second group of shutter-closing shutter blades actuatable through a working stroke from a retracted position wherein they open said shutter aperture to an extended position wherein they close said shutter aperture; shutter actuating means for sequentially actuating the first and second shutter blade groups to effect first opening and then closing of said shutter aperture thereby defining an exposure; and combined braking-stopping means separate and distinct from said shutter actuating means and having a frictional braking portion and a subsequently effective stopping portion both disposed along the path of travel of the same end portions of the shutter blades within at least one of said first and second shutter blade groups for sequentially braking the motion of said shutter blades by said frictional braking portion as they near completion of their working stroke and effecting precise stoppage of said shutter blades directly by said stopping portion at a predetermined stop position at the end of their working stroke.

2. A shutter assembly according to claim 1; wherein said braking-stopping means comprises a single resiliently flexible member having said braking portion extending into said path of travel of said shutter blades and slidably engageable with said shutter blades to frictionally brake the motion of said shutter blades as they near completion of their working stroke and having a stopping portion extending directly across said path of travel to abut with said shutter blades and positively stop them at said predetermined stop position.

3. A shutter assembly according to claim 2; wherein said braking portion of said flexible member comprises an arcuate bowed portion thereof bowed inwardly across said path of travel of said shutter blades to apply a progressively increasing braking force to said shutter blades as they move through completion of their working stroke.

4. A shutter assembly according to claim 3; wherein said stopping portion of said flexible member comprises a bent portion thereof connected to the end of said bowed portion and extending directly into and completely blocking said path of travel of said shutter blades for engaging therewith and positively stopping them at said predetermined stop position.

5. A shutter assembly according to claim 2; wherein said stopping portion of said flexible member comprises a bent portion thereof extending directly into and completely blocking said path of travel of said shutter blades for engaging therewith and positively stopping them at said predetermined stop position.

6. A shutter assembly according to claim 2; wherein said flexible member comprises a flexible spring plate.

7. A shutter assembly according to claim 2; including combined braking-stopping means disposed along the path of travel of the shutter blades within each of said first and second shutter blade groups.

* * * * *